(12) United States Patent
Brenner et al.

(10) Patent No.: US 9,464,625 B2
(45) Date of Patent: Oct. 11, 2016

(54) WIND TURBINE

(75) Inventors: Albrecht Brenner, Aurich (DE); Frank Knoop, Aurich (DE); Matthias Ubben, Emden (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 233 days.

(21) Appl. No.: 14/114,116

(22) PCT Filed: Apr. 18, 2012

(86) PCT No.: PCT/EP2012/057091
§ 371 (c)(1),
(2), (4) Date: Jan. 6, 2014

(87) PCT Pub. No.: WO2012/146521
PCT Pub. Date: Nov. 1, 2012

(65) Prior Publication Data
US 2014/0110949 A1 Apr. 24, 2014

(30) Foreign Application Priority Data

Apr. 29, 2011 (DE) ........................ 10 2011 017 801

(51) Int. Cl.
*H02K 15/00* (2006.01)
*F03D 11/00* (2006.01)
*F03D 9/00* (2016.01)
*H02K 7/18* (2006.01)

(52) U.S. Cl.
CPC .............. *F03D 11/00* (2013.01); *F03D 9/002* (2013.01); *F03D 80/00* (2016.05); *H02K 7/1838* (2013.01); *H02K 15/00* (2013.01); *F05B 2220/7066* (2013.01); *Y02E 10/721* (2013.01); *Y02E 10/725* (2013.01)

(58) Field of Classification Search
CPC ..... F03D 11/00; F03D 9/002; H02K 7/1838; H02K 15/00; Y02E 10/721; Y02E 10/725; F05B 2220/7066
See application file for complete search history.

(56) References Cited

U.S. PATENT DOCUMENTS

| 6,476,534 B1* | 11/2002 | Vanderbeck ............. H02K 7/14 310/268 |
|---|---|---|
| 7,165,941 B2 | 1/2007 | Wobben |
| 7,726,941 B2 | 6/2010 | Bervang |
| 7,861,404 B2* | 1/2011 | Fayewicz ........... H02K 15/0006 29/596 |
| 2003/0194310 A1 | 10/2003 | Canini et al. |
| 2006/0196288 A1 | 9/2006 | Aust et al. |

FOREIGN PATENT DOCUMENTS

| AL | 1 412 638 A1 | 4/2004 |
| CN | 1155312 A | 7/1997 |
| CN | 1688808 A | 10/2005 |

(Continued)

*Primary Examiner* — Richard Chang
(74) *Attorney, Agent, or Firm* — Seed Intellectual Property Law Group PLLC (57) ABSTRACT

There is provided a wind power installation comprising a rotor to which rotor blades can be fitted, an electric generator having a generator stator and a generator rotor, and a plurality of displacement units. The first end of the displacement unit is fastened to the generator stator and the second end of the displacement unit is releasably fastened to the generator rotor. The displacement units each have a respective hydraulic cylinder, the deflection of which is controllable so that by actuation of the displacement unit the generator rotor is displaced relative to the generator stator.

5 Claims, 6 Drawing Sheets

(56) References Cited

FOREIGN PATENT DOCUMENTS

| | | |
|---|---|---|
| DE | 102 24 439 A1 | 12/2003 |
| DE | 103 05 543 A1 | 8/2004 |
| EP | 1 659 286 A1 | 5/2006 |
| HU | 226 510 B1 | 3/2009 |
| JP | 2004-501315 A | 1/2004 |
| RU | 67194 U1 | 10/2007 |
| SU | 74858 A1 | 11/1948 |
| WO | 96/05391 A1 | 2/1996 |
| WO | 01/98655 A1 | 12/2001 |
| WO | 03/012291 A1 | 2/2003 |
| WO | 2010/103086 A2 | 9/2010 |

* cited by examiner

WIND TURBINE

BACKGROUND

1. Technical Field

The present invention concerns a wind power installation.

2. Description of the Related Art

Various concepts are known for fitting and removing rotor blades of a wind power installation.

DE 102 24 439 discloses a wind power installation having a direction-changing roller and a cable guide means in the region of the pylon head of the wind power installation for passing a hauling cable from the winch therethrough. A rotor blade is then pulled up to the pylon head by means of that cable and suitably fastened.

DE 103 05 543 discloses a further method of fitting rotor blades. In that case the rotor hub is rotated into a predetermined first position. A rotor blade is mounted in place and the rotor hub is rotated by means of the rotor blade into a predetermined second position. In that case rotation of the rotor hub is effected in the direction of the action of the force of gravity of the first rotor blade which has already been fitted in place.

EP 1 412 638 discloses a further method of fitting rotor blades. In that case compensating weights are used instead of the rotor blades in the blade fitting operation.

BRIEF SUMMARY

One or more embodiments of the present invention are directed to providing a wind power installation which permits rotor blade fitment even in relation to very high wind power installations.

One embodiment is directed to providing a wind power installation comprising a rotor to which rotor blades can be fitted, an electric generator having a generator stator and a generator rotor, and a plurality of displacement units. The first end of the displacement unit is fastened to the generator stator and the second end of the displacement unit is releasably fastened to the generator rotor. The displacement units each have a respective hydraulic cylinder, the deflection of which is controllable so that by actuation of the displacement units the generator rotor is displaced relative to the generator stator. Thus rotation of the rotor is also caused.

In an aspect of the invention the displacement unit has a bracket at its first end and a fork at its second end. The bracket is fastened to the generator stator or to a fixed component of the generator stator and the fork is fastened to the generator rotor. The hydraulic cylinder is provided between the fork and the bracket.

In a further aspect of the invention the fork is releasably fastened to a brake disc of the generator rotor.

Another embodiment is directed to a method of fitting or removing rotor blades of a wind power installation. In that case the wind power installation has a rotor and an electric generator. The generator has a generator stator and a generator rotor. The rotor is coupled to the generator rotor. A first end of a displacement unit is fastened to the generator stator. A second end of the displacement unit is releasably fastened to the generator rotor. The displacement units have a hydraulic cylinder, the deflection of which is controllable. The hydraulic cylinder is actuated to achieve deflection. The second end of some of the displacement units is removed. The hydraulic cylinder of some of the displacement units is actuated to contract the hydraulic cylinder. The second end of the displacement unit is in turn again fitted to the generator rotor. Renewed actuation of the hydraulic cylinder is then effected to deflect the hydraulic cylinder and thus produce a relative displacement between the generator stator and the generator rotor and therewith also rotation of the rotor.

One embodiment is directed to using a displacement unit having a hydraulic cylinder for producing a relative displacement between a generator rotor and a generator stator of a generator of a wind power installation. In that case a first end of the displacement unit is fastened to the generator stator and the second end of the displacement unit is fastened to the generator rotor. By deflection of the hydraulic cylinder, a relative movement is produced between the generator rotor and the generator stator.

Because the rotor of the wind power installation is preferably fixedly coupled to the generator rotor, rotation of the generator rotor also leads to a rotation of the rotor of the wind power installation. Thus rotation of the generator rotor and therewith also rotation of the rotor of the wind power installation can be implemented by stepwise displacement of the generator rotor relative to the generator stator.

An embodiment is directed to the notion of providing at least one displacement unit, for example having at least one hydraulic cylinder, between a stator and a rotor of the generator of the wind power installation. In that case the displacement unit is adapted to be dismantleable so that it is used only upon fitting or removing rotor blades of the wind power installation. The displacement units are then removed for the actual operation of the wind power installation. Preferably a plurality of displacement units are arranged around the periphery of the stator and the rotor respectively of the generator. The rotor can be rotated through a predetermined angle relative to the stator by activation of the hydraulic cylinders (extension of the cylinder) of the displacement units. As the hydraulic cylinders of the displacement units only have a limited stroke movement, displacement of the rotor of the generator and therewith also of the rotor blades fastened to the spinner or the rotor of the wind power installation can be effected only stepwise or in portion-wise fashion. For that purpose it may be necessary to at least partially remove the displacement units and re-fit them at another location, in which case however one of the displacement units should remain fitted to ensure a certain braking effect.

Further configurations of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
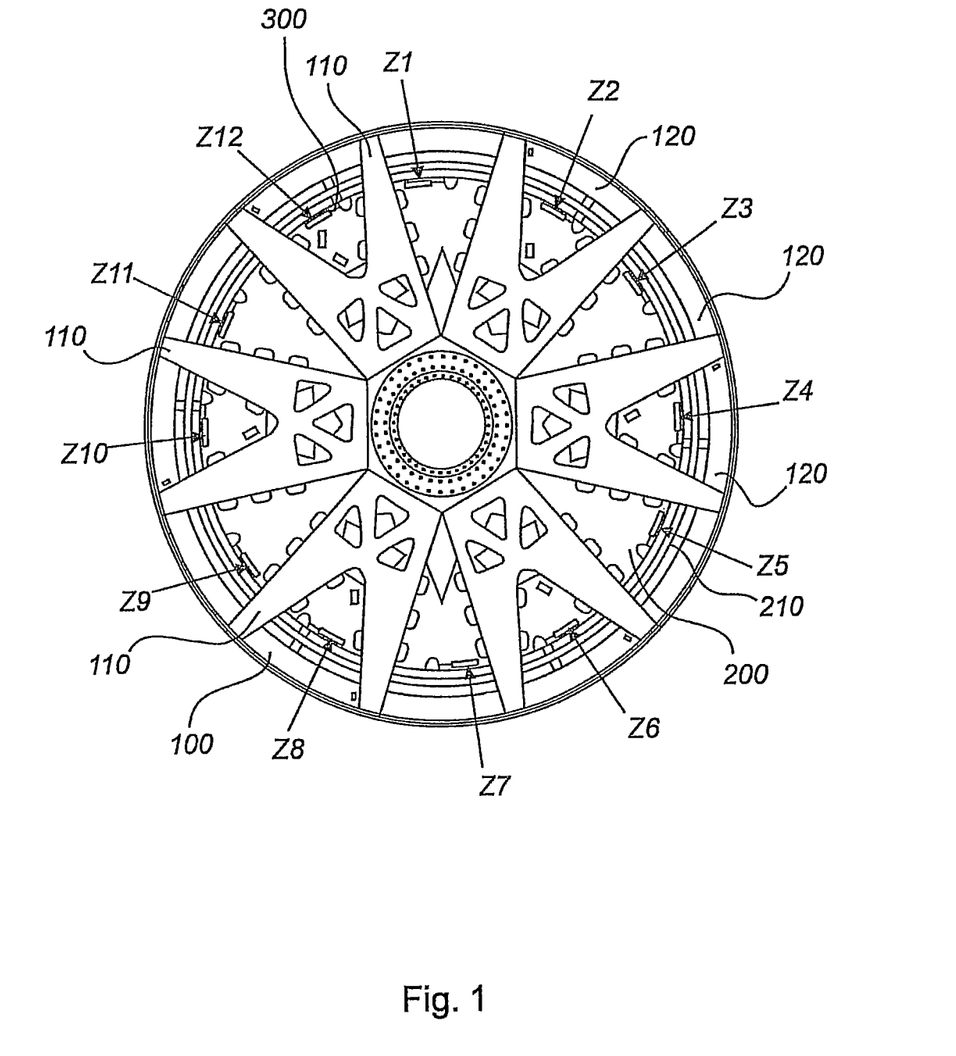
FIG. 1 shows a diagrammatic view of a generator of a wind power installation according to a first embodiment.

FIG. 1 shows a diagrammatic view of a generator of a wind power installation according to a first embodiment. The wind power installation has a pylon, a pod on the pylon and a rotor (see FIG. 7). The rotor of the wind power installation represents the rotating part of the wind power installation, that is to say for example the rotor blades and the rotor hub. The generator of the wind power installation is preferably provided within a pod (not shown) of a wind power installation. The generator comprises a generator stator 100 and a generator rotor 200. The rotor of the wind power installation is connected to the generator rotor so that rotation of the rotor also causes rotation of the generator rotor 200 and vice-versa. The generator stator 100 has a plurality of stator arms 110 which carry a stator ring 120. The rotor 200 of the generator is provided within the stator ring. In addition there are twelve displacement units 300. Those displacement units 300 can each have a respective hydraulic cylinder Z1-Z12. In this arrangement the first end of the displacement unit is fastened to one of the stator support arms 110 while the second end is fastened to the rotor 200 of the generator. The rotor can be displaced relative to the stator by actuation of the respective displacement units 300.

In FIG. 1 there are twelve displacement units between each two adjacent stator support arms. According to the invention however it is also possible to provide fewer than twelve or more than twelve displacement units.

Although FIG. 1 shows that the stator has a stator ring and stator arms, the stator can also be of a different structure. According to one embodiment of the invention the displacement units are provided between the generator rotor and the generator stator so that actuation of the hydraulic cylinders of the displacement units also leads to a relative displacement between the generator rotor and the generator stator.

Figure 2:
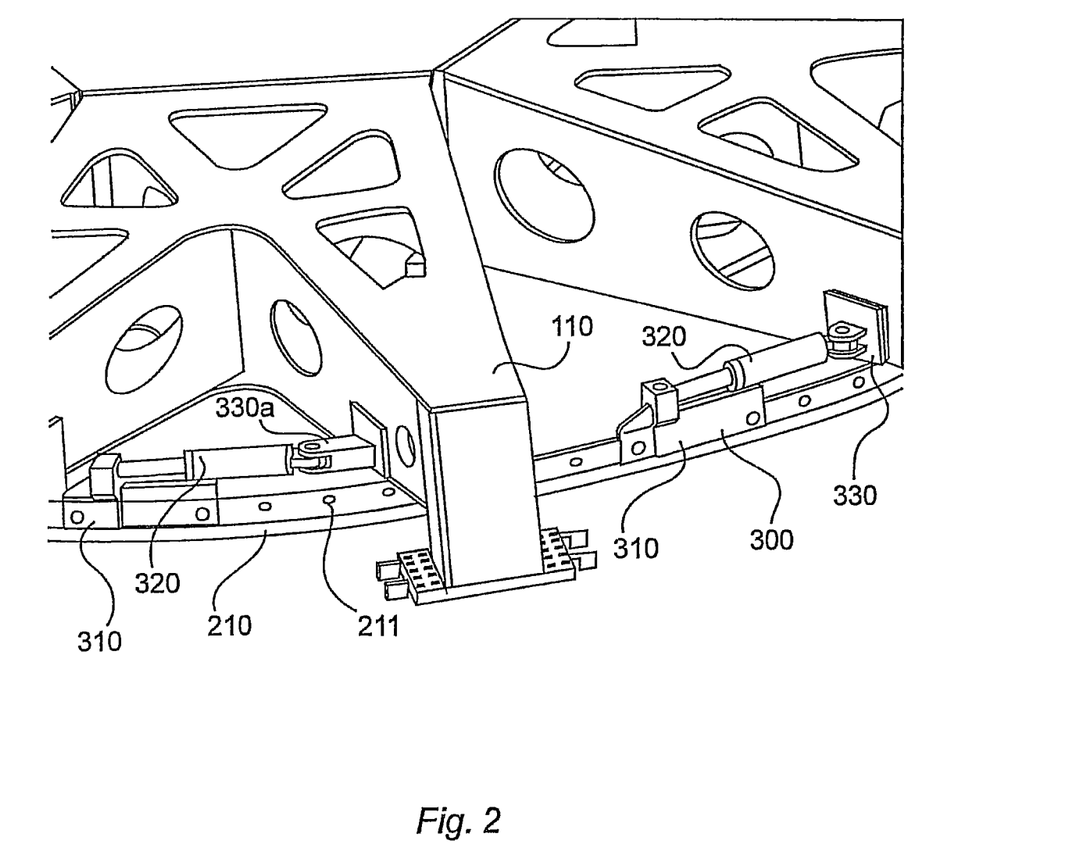
FIG. 2 shows a diagrammatic view of a portion of the generator of the wind power installation according to the first embodiment.

FIG. 2 shows a diagrammatic perspective view of a portion of the generator of the first embodiment of FIG. 1. Some parts of the generator such as for example the stator ring and further parts of the rotor are not shown in FIG. 2. FIG. 2 only shows a part 210 of the rotor. The part 210 (for example a brake disc of the rotor) preferably has a plurality of holes 211. The displacement unit 300 has a fork 310 at its first end and a bracket 330 at its second end. A hydraulic cylinder 320 is provided between the fork 310 and the bracket 330. The fork 310 is fastened for example by means of bolts or a screw means in the holes 211. The bracket 330 is fastened to one of the stator support arms 110. Preferably the brackets 330 are respectively fastened either to the left-hand or the right-hand side of the stator support arm 310.

Figure 3:
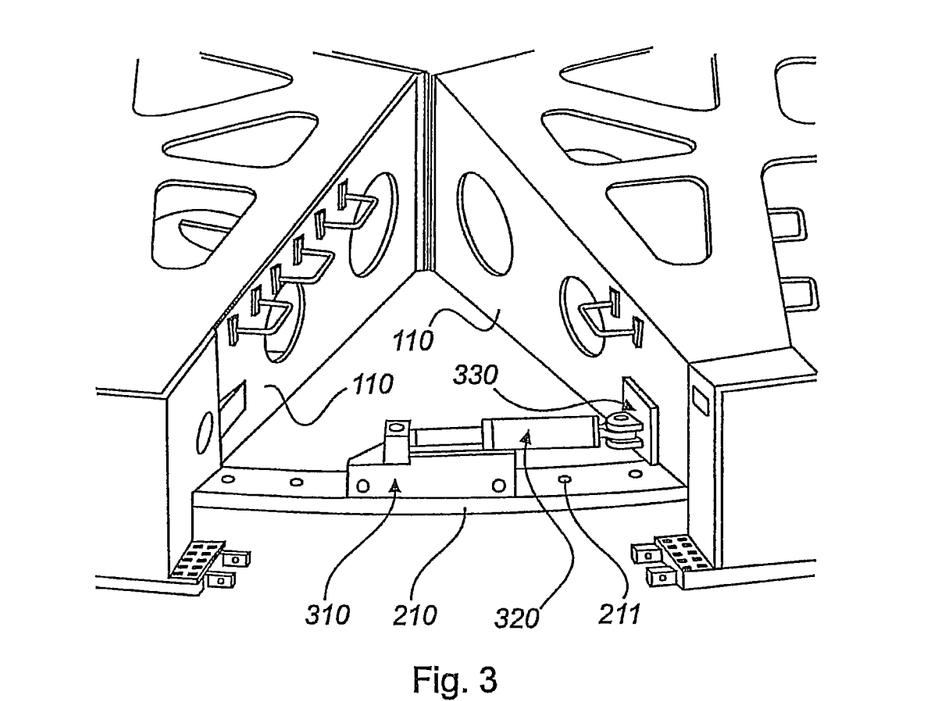
FIG. 3 shows a diagrammatic view of a further portion of the generator of a wind power installation according to the first embodiment.

FIG. 3 shows a further portion of a generator according to the first embodiment. Some parts of the generator such as for example the stator ring are also not shown in FIG. 3. The displacement unit 300 has a fork 310 at its first end and a bracket 330 at its second end. A hydraulic cylinder 320 is provided between the bracket 330 and the fork 310. The fork 310 has at least one hole through which the fork can be releasably fastened in holes 211 of a part 210 of the rotor.

Figure 4:
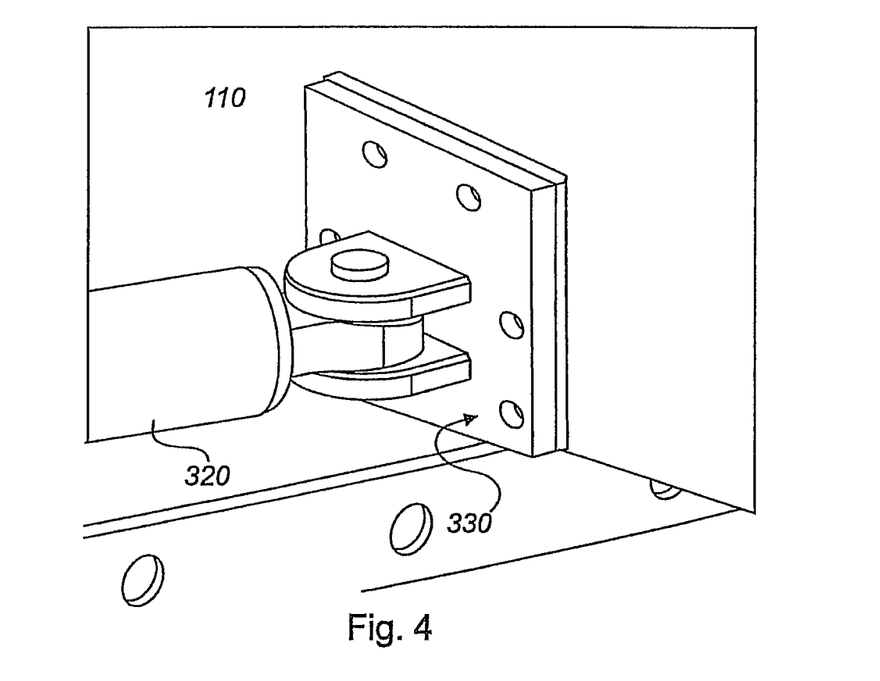
FIG. 4 shows a view on an enlarged scale of a further portion of a generator of a wind power installation according to the first embodiment.

FIG. 4 shows a perspective view of the second end of the displacement unit of FIG. 3. In this case the bracket 330 of the displacement unit is releasably fastened to a stator arm 110. That can be effected for example by way of a screw means. FIG. 4 also shows an end of the hydraulic cylinder 320.

According to one embodiment of the invention the bracket can be of differing lengths so that the displacement unit can be adapted to the corresponding installation situations in the wind power installation.

Figure 5:
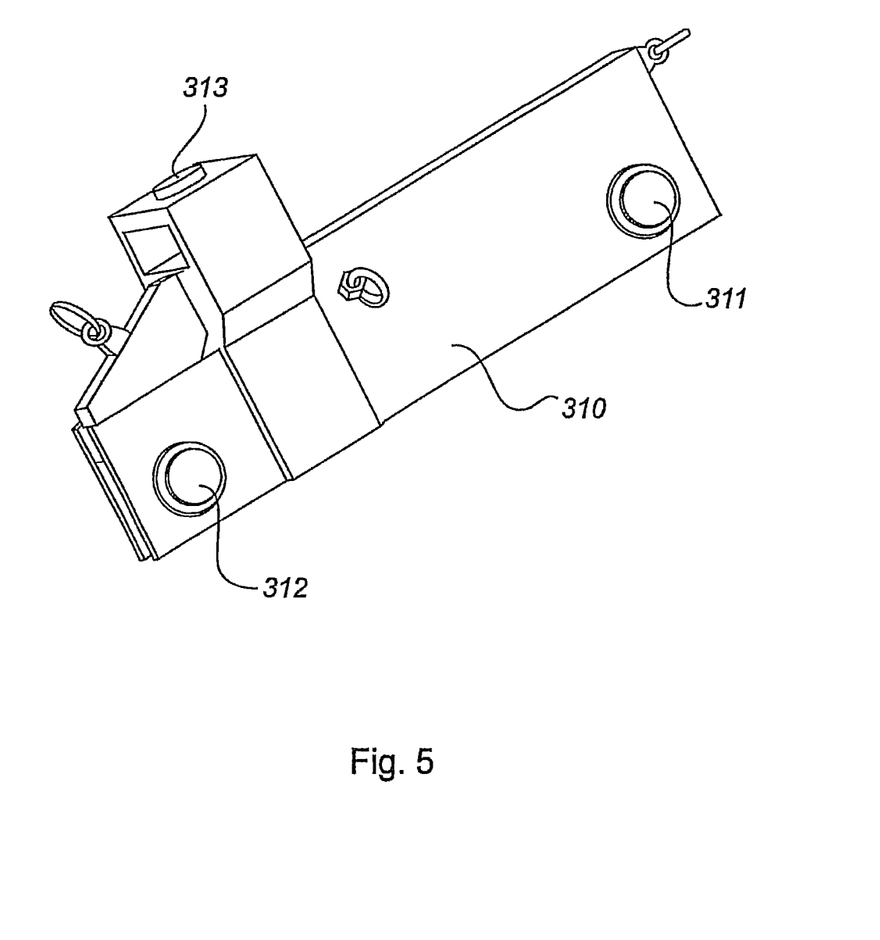
FIG. 5 shows a perspective view of a fork of a displacement unit in the generator of the wind power installation according to the first embodiment.

FIG. 5 shows a diagrammatic view of the fork 310 of the first embodiment. The fork has two holes 311, 312. Those holes serve to fasten the fork to a part 210 of the rotor. The fork further has a portion 313 serving to receive an end of the hydraulic cylinder.

Figure 6A:
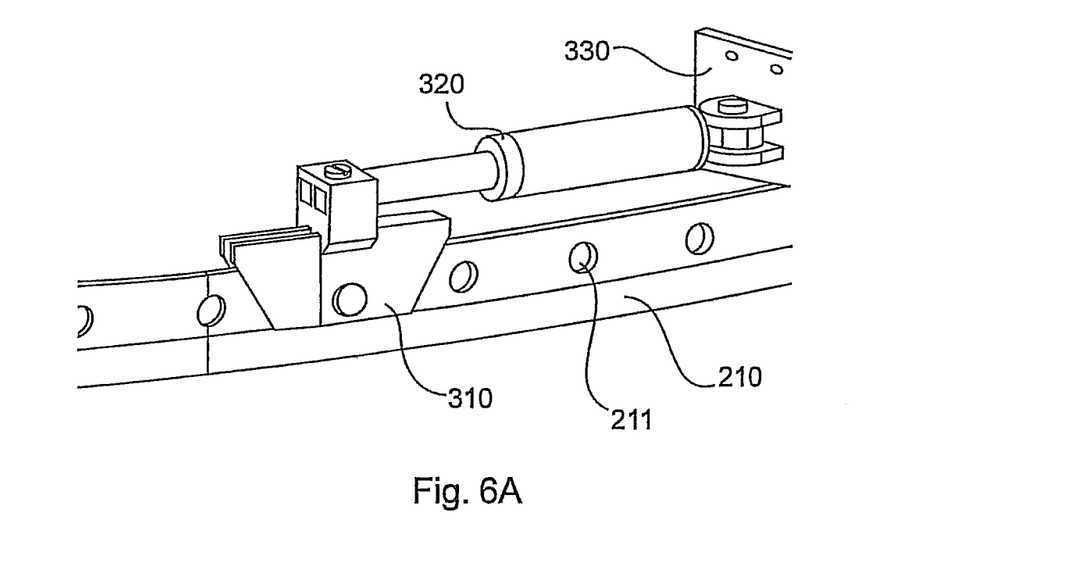
FIGS. 6A and 6B show various perspective views of a displacement unit for a generator of a wind power installation according to a second embodiment.
Figure 6B:
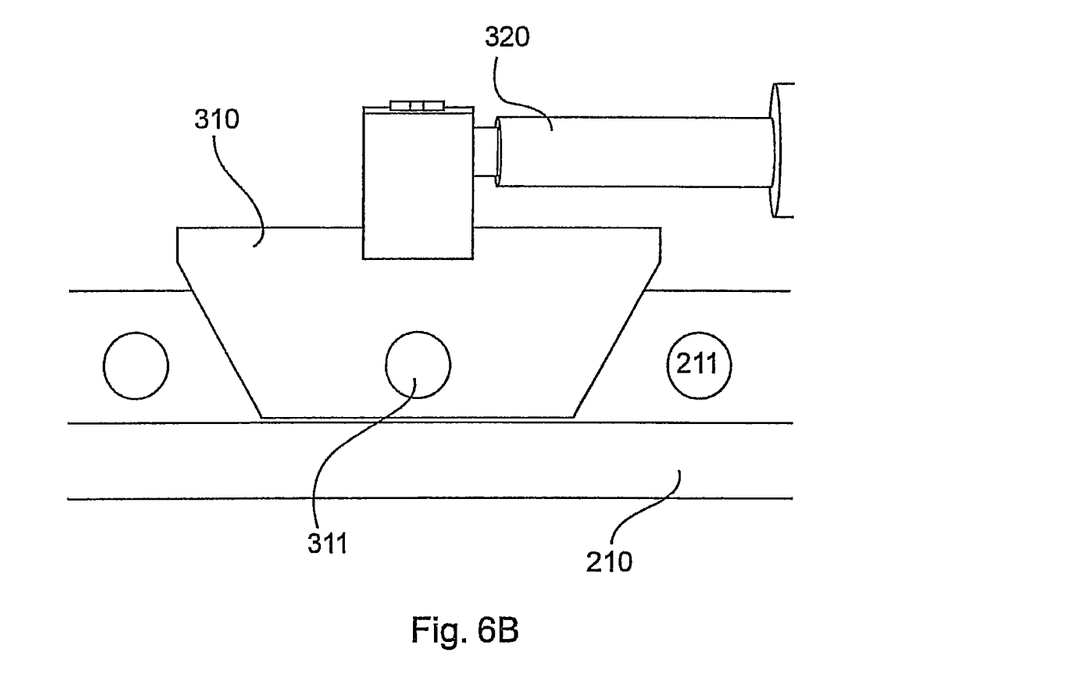

FIGS. 6A and 6B show two diagrammatic views of a displacement unit for a generator according to a second embodiment. The displacement unit 300 has a fork 310, a bracket 330 and therebetween a hydraulic cylinder 320. The fork 310 has a hole 311, by means of which the fork can be releasably fastened to the part 210. The bracket 330 can also be releasably fastened to a support arm or another part of a stator of the generator.

The hydraulic cylinders of the first and second embodiments have for example optionally an operating pressure of 700 bars, a pressing force of 72 t, a pulling force of 50 t and are of a weight of for example 54 kg.

The removable displacement units according to the first and second embodiments are used in particular in fitting and removing rotor blades of a wind power installation. Particularly in the case of very large wind power installations, the use of the displacement units makes it possible to dispense with a crane that is otherwise typically used for rotating the rotor (spinner) of the wind power installation. The displacement units are fastened at their one end for example to a brake disc of the rotor and at their second end to a support arm or another part of the stator of the generator.

One or more embodiments of the displacement units can produce a displacement (relative as between the generator rotor and the generator stator) of for example a few degrees. With the use of the displacement units it is possible to rotate a rotor (spinner) of the wind power installation even when one or two rotor blades are already fastened thereto. It is thus also possible in that way to ensure rotation under load. If at least one of the displacement units is fitted in place, that displacement unit can also be used to limit a rotary movement as the rotation can never be more than the stroke travel of the hydraulic cylinders.

According to one embodiment of the invention the brackets 330 can be of a differing length to be adapted to different installation situations. In that respect the displacement units can be of such a design configuration that for example in the first embodiment ten of the twelve displacement units may be utilized to rotate the rotor.

The displacement units are used in particular in fitting or removing rotor blades of a wind power installation. A connection for a rotor blade can be rotated by means of the displacement units into a 9 o'clock position so that a rotor blade can be fitted in place. The pod can then be rotated through 180°. Thereafter the hydraulic cylinders of the displacement units are extended and the generator rotor can move for example through 3.75° (the rotor of the wind power installation also moves therewith as they are coupled together). Then for example two cylinders can be released while the other cylinders hold the entire system. The piston rods of the hydraulic cylinders are retracted and the fork as well as the bracket are released and can be fastened again, that is to say at another location. Further ones of the for example ten displacement units are then released and re-fitted at another location. As an alternative thereto it is possible to dispense with release and re-fitting, more specifically by only the fork being dismantled from the brake disc and re-fitted at another location. By way of example 16 stroke movement processes have to be performed to rotate the rotor of the generator through 60° so that the next blade adaptor is at the 9 o'clock position and the next rotor blade can be fastened in place. As an alternative thereto the connection can also be rotated into a 6 o'clock position and the blade can be fitted from below with a cable system and thereafter further rotated through 120°.

The rotor of the wind power installation then has to be rotated through 120° so that the next rotor blade can be fastened to the third blade adaptor.

Figure 7:
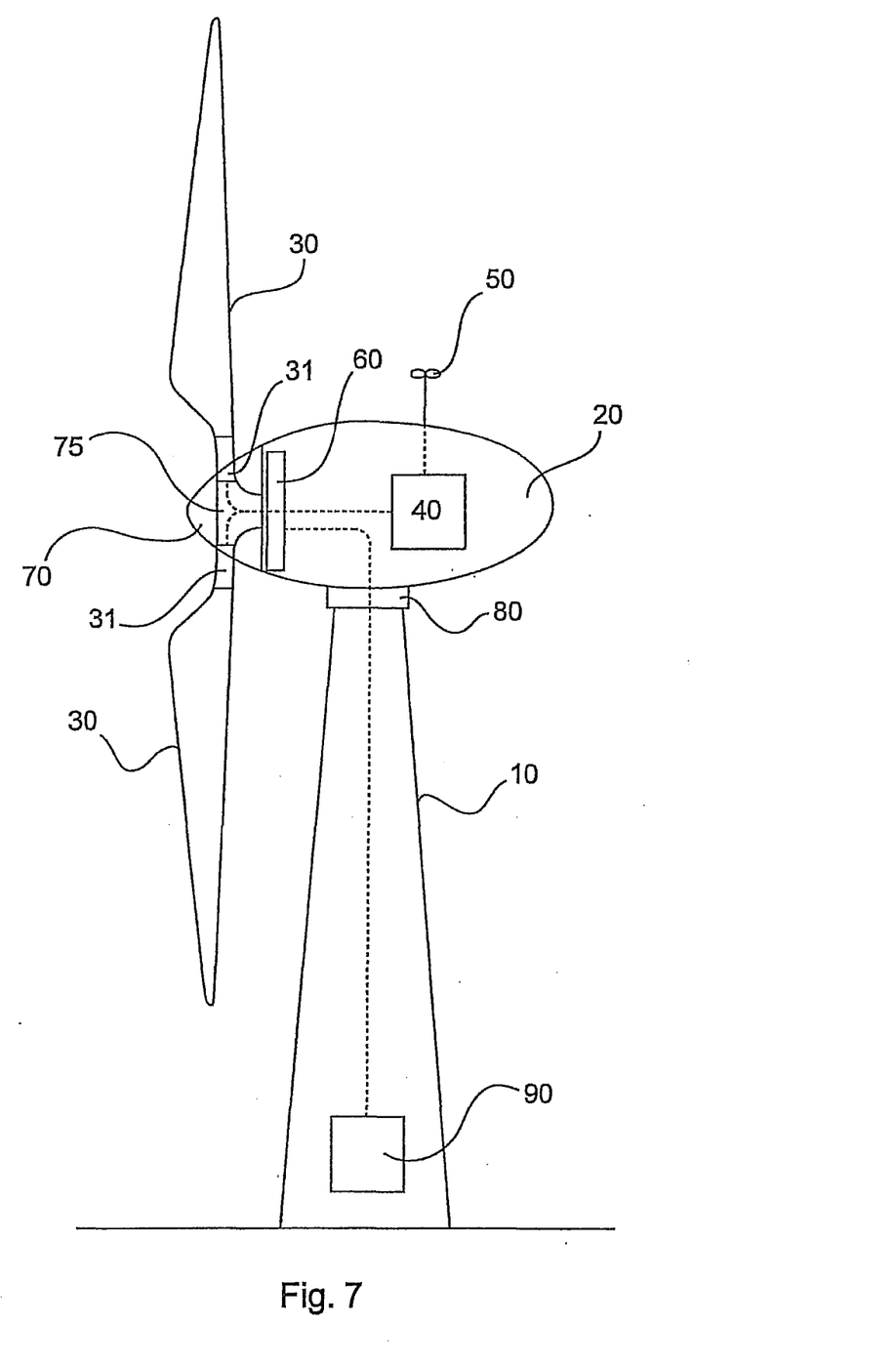
FIG. 7 shows a diagrammatic view of a wind power installation according to the invention.

FIG. 7 shows a diagrammatic view of a wind power installation comprising an electric generator, such as the generator of FIG. 1, according to an embodiment of the invention. The wind power installation has a pylon 10 and a pod 20 on the pylon 10. The azimuth orientation of the pod can be altered by means of an azimuth drive 80 to adapt the orientation of the pod to the currently prevailing wind direction. The pod 20 has a rotatable rotor 70 having at least two and preferably three rotor blades 30. The rotor blades 30 can be connected to a rotor hub 75 which in turn is connected to an electric generator 60 directly or by means of a gear (not shown). The generator rotor is rotated by rotation of the rotor blades 30 and the rotor 70 and thus electric power is generated.

The wind power installation can further have a control unit 40 for controlling operation of the wind power installation. In addition an anemometer and/or a wind direction indicator 50 can be provided on the pod 20. The control unit 40 can adjust the pitch angle of the rotor blades 30 by means of the pitch drives 31. In addition the control unit 40 can control the azimuth orientation of the pod by means of the azimuth drive 80. The electric power generated by the generator 60 can optionally be passed to a power cabinet 90, for example in the base of the pylon 10. A converter can be provided in the power cabinet 90, which can deliver the electric power to the power supply network at a desired voltage and frequency.

Rotation of the rotor 70 (for example for rotor blade fitment) can be effected in accordance with the first or second embodiment.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind power installation comprising:
   an aerodynamic rotor configured to have rotor blades fixed thereto and removed therefrom;
   an electric generator having a generator stator and a generator rotor, the generator rotor being directly coupled to the aerodynamic rotor; and
   a plurality of displacement units, each having a first end that includes a bracket directly and releasably fastened to the generator stator and a second end that includes a fork directly and releasably fastened to the generator rotor, each of the displacement units having a respective hydraulic cylinder between the fork and the bracket, wherein a deflection of each of the hydraulic cylinders is controllable and causes a displacement of the generator rotor relative to the generator stator whereby rotation of the aerodynamic rotor is effected, wherein the bracket and the fork are fastened to the generator stator and the generator rotor, respectively, while rotor blades are being fixed to or removed from the aerodynamic rotor.

2. The wind power installation according to claim 1 wherein the fork is releasably fastened to a brake disc of the generator rotor.

3. The wind power installation according to claim 1, wherein the generator stator has a plurality of stator arms.

4. The wind power installation according to claim 1, wherein each respective displacement unit is located between two adjacent stator arms.

5. The wind power installation according to claim 1, wherein the generator rotor includes a plurality of holes, wherein each of the forks is directly and releasably fastened to the generator rotor at the plurality of holes.

* * * * *